United States Patent

Mirkovic

[15] 3,638,881

[45] Feb. 1, 1972

[54] BRAKE APPARATUS

[72] Inventor: Ninko Tihomir Mirkovic, Indianapolis, Ind.

[73] Assignee: RCA Corporation

[22] Filed: Oct. 16, 1969

[21] Appl. No.: 866,949

[52] U.S. Cl. ....................242/204, 192/135

[51] Int. Cl. ....................B11b 15/32, G03b 1/04

[58] Field of Search ....................242/204–210; 188/136, 135, 74

[56] References Cited

UNITED STATES PATENTS 469,013 2/1892 Des Georges ....................188/136

660,186 10/1900 Goettmann, Sr. ....................188/136

*Primary Examiner*—Leonard D. Christian

*Attorney*—Edward J. Norton

[57] ABSTRACT

A braking arrangement wherein the amount of braking effected on a moving member is determined by the direction of movement of the braked member. Braking is applied to the member via a brakeshoe which is movably coupled to a lever means. In response to the contacting relation with the moving member, the brakeshoe is positioned along the lever means with respect to the fulcrum of the lever. The position of the brakeshoe with respect to the lever means fulcrum determines the effective braking force transmitted to the moving member.

5 Claims, 5 Drawing Figures

PATENTED FEB 1 1972 3,638,881

SHEET 1 OF 2

INVENTOR.
Ninko T. Mirkovic
BY James B. Hayes
ATTORNEY

PATENTED FEB 1 1972

3,638,881

INVENTOR.
Ninko T. Mirkovic
BY James B. Hayes
ATTORNEY

BRAKE APPARATUS

This invention relates to improved braking systems and more particularly to improved systems wherein the amount of braking effected on the braked member, for a given applied actuating force, is dependent upon the direction of motion of the member to be braked. Such a braking system is particularly, although not exclusively, useful in recorder-reproducer tape systems.

In recorder-reproducer systems wherein a web or tape is utilized as the recording medium, a braking system is required to provide proper winding and unwinding of the tape between a supply reel and a takeup reel. Due to the fact that the supply and takeup reels are connected by the tape itself, at least two unfavorable situations might occur when braking is applied to the reels. First, the supply reel may be braked too much, or may stop much earlier than the takeup reel. The consequence is an excessive increase of the tape tension, which might result in breaking of the tape. Alternatively, the takeup reel may be driven too slowly, or stop earlier than the supply reel, causing a complete loss of tape tension and spilling of the tape. These two situations are primarily the result of the varying inertia, and effective diameter of the tape on each of the reels. This situation is further compounded by the fact that either reel may be the takeup or supply reel depending upon the direction of travel of the tape medium.

With the present invention a unique braking action in accordance with the direction of the braked member is afforded for utilization in braking applications generally. Preferred exemplificative embodiments of the invention are shown and described for eliminating excessive stretch and spilling of the record medium in a recorder-reproducer system.

The particular differential magnitude of braking may be determined by a consideration of the specific tension limits of the medium and the required braking time.

Briefly in accordance with an embodiment of the invention, an apparatus to brake a moving member is provided which comprises a shoe adapted to transmit a braking force to a surface of the moving member. Lever means are provided for urging the shoe into contacting relation with the surface of the moving member, in response to a force applied to the lever means. There are means for coupling the shoe to the lever means in a manner to cause the leverage transferred to the shoe by the lever means to be determined by the direction of movement of the member.

The invention will be described in greater detail by reference to the drawings, in which:

FIG. 1 shows a pair of brake assemblies 2 and 4 which illustrate, and are helpful in understanding the operation of, the invention.

Figure 1:
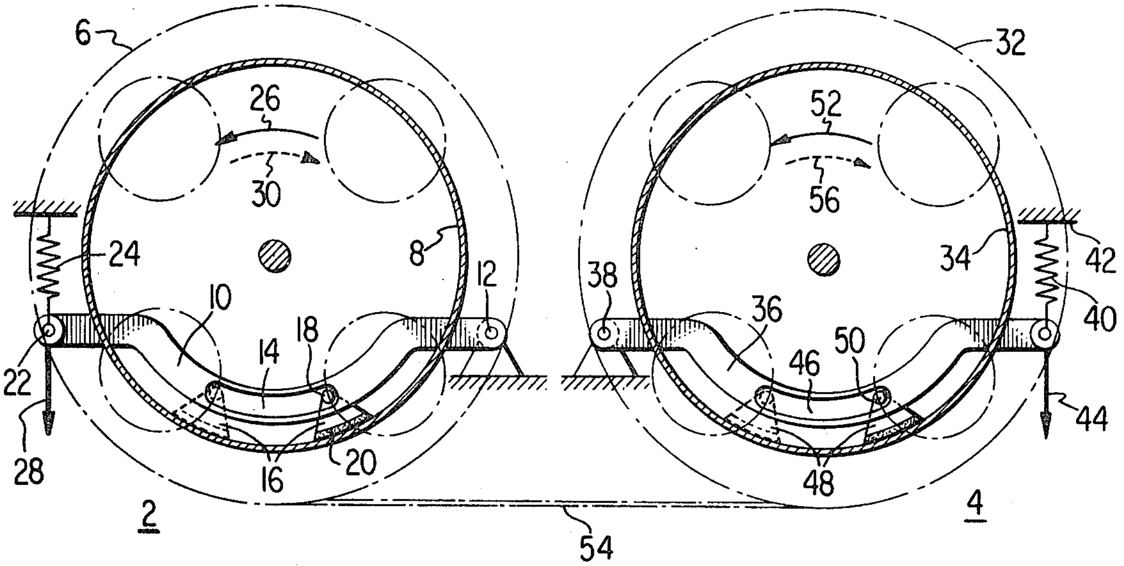
FIG. 1 is a diagrammatic view of an embodiment of the invention which is illustrative of the principles of operation of the invention.

The assembly 2 of FIG. 1 has a movable member 6 including a surface 8 comprising a brakedrum adapted to have a braking force applied thereto. Lever means including an arm 10 is disposed adjacent the movable member 6. The lever arm 10 has a pivotal mounting 12 at one end which forms a fulcrum for the lever arm 10. The lever arm 10 has an elongated slot 14 therein which is concentric with the brakedrum 8.

A brakeshoe 16 for transmitting the braking force to the movable member 6 is disposed between the lever arm 10 and the brakedrum surface 8. The brakeshoe 16 is pivotally coupled to the lever arm 10 by a pin 18 which is slidable in the slot 14. Preferably the brakeshoe 16 includes a portion of wear- and heat-resistant material such as asbestos which coacts with the brakedrum 8.

Coupled to the free end 22 of the lever arm 10 is a resilient means 24 for example a spring. The means 24 is preferably provided to bias the brakeshoe 16 out of contact with the drum 8 when no braking of the moving member 6 is desired.

Assume the member 6 is moved in the counterclockwise direction indicated by the solid arrow 26. When it is desired to brake the moving member 6, a force is applied to the free end 22 of the lever arm 10, in the direction diagrammatically represented by the arrow 28. The applied force causes the arm 10 to pivot and bring the shoe 16 into contacting relation with the moving drum 8. As a result of this contact, the pin 18 and the shoe 16, which is free to move in the slot 14, is moved to a point fixed by the extent of the slot 14. Since the direction of the drum 8 is counterclockwise, the shoe 16 moves to a position in the slot 14 which is nearest the fulcrum 12 of the lever 10. Therefore the leverage transferred to the shoe 16 and hence the braking applied to the drum 8, for a given applied force 28, is determined by the direction of movement of the member 6.

Let it now be assumed that the member 6 is moved in a clockwise direction as indicated by the dashed arrow 30. Again applying a force indicated diagrammatically by the arrow 28, causes the shoe 16 which is slidably coupled to the lever arm 10, to come in contact with the drum 8. Now however, since the direction of travel of the drum 8 is clockwise, the shoe 16 will assume a position along the arm 8 as shown by dashed lines for the shoe 16. In this position the shoe 16 is further separated from the fulcrum 12 than when the member 6 was moving counterclockwise. Therefore, the resultant braking on the member 6, for the same applied force 28, is less when the member is moving clockwise. Thus it is seen that for a given applied force 28, the resulting magnitude of the braking on the moving member 6, is automatically determined in accordance with the direction of movement of the member 6.

The assembly 4 of FIG. 1 also includes a movable member 32 with a brakedrum 34. Lever means including an arm 36 has a pivotal mounting 38 at one end which forms a fulcrum. The other end of lever arm 36, rotatable about the pivot 38, is coupled by resilient means 40 to a fixed reference point 42, and a force represented by the arrow 44 may be applied thereto as shown. The lever arm 36 also has a slot 46 in which is slidably mounted a brakeshoe 48 by means of a pin 50.

It is noted that the makeup of the assembly 4 is the same as that of the assembly 2 with the exception, that the ends of the lever arms 10 and 36 are reversed in respect of the leading and trailing indication of the respective direction arrows 26 and 52. The operation of the assembly 4 however is in the same manner as just described for the assembly 2.

In the FIG. 1, the moving members 6 and 32 may, for example, comprise rotatable reels between which is wound an elongated web or tape 54. Arranging the braking assemblies 2 and 4 for the members 6 and 32 as shown in FIG. 1, provides differential braking in accordance with the direction of movement of the members 6 and 32. That is, when the members 6 and 32 are rotated in the direction of the arrows 26 and 52, and equal forces 28 and 44 are applied, the shoes 16 and 48 will assume the position shown by the solid lines for the shoes 16 and 48. Since the shoe 16 is a smaller distance from its fulcrum 12 than shoe 48 is from its fulcrum 38, the resulting braking on the member 6, which is now feeding the web 54, is greater than the braking force on the member 32 which is taking up the web 54.

Rotating the members 6 and 32 in the direction of arrows 30 and 56, and applying equal forces 28 and 44, will cause the shoes 16 and 48 to automatically assume the positions as shown by dashed lines in FIG. 1. Since now the distances from the respective fulcrums 22 and 38 are reversed, the member 32 is braked more than the member 6.

Figure 2:
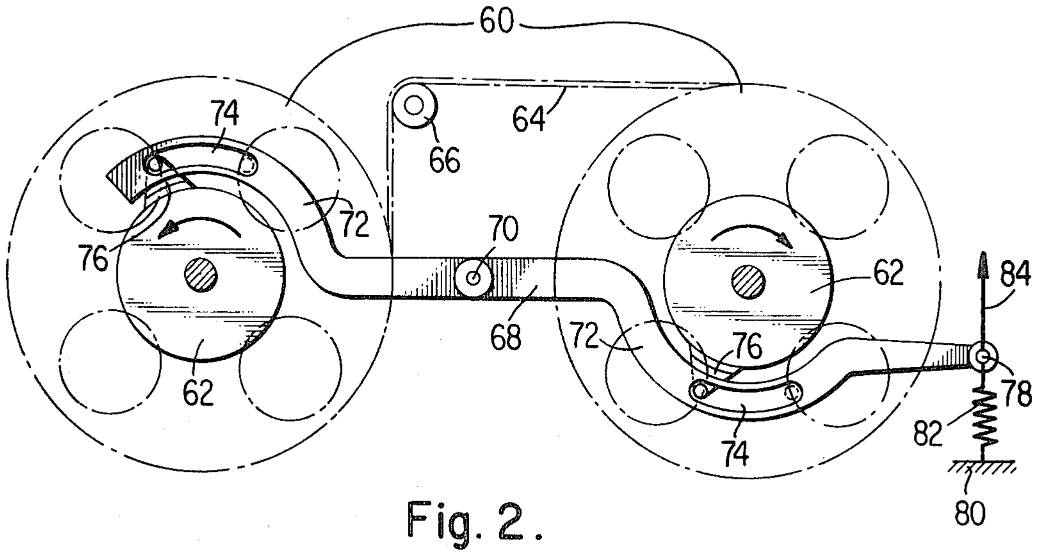
FIG. 2 is a diagrammatic view of a further arrangement according to the invention.

FIG. 2, shows another arrangement embodying the present invention in which a single lever means is utilized. In FIG. 2, a pair of contrarotating movable members 60 with respective brakedrums 62 are shown. Again the members 60 may comprise supply and takeup reels for a web 64 which is wound between them and over a guide roller 66. A lever arm 68, which has a centrally located fulcrum 70 has portions 72 extending adjacent each of the brakedrums 62. In the lever portions 72 are slots 74 extending along each of the drums 62. Slidably coupled to the lever 68, by the captive action of the slots 74, are brakeshoes 76 adapted to coact with the respective drums 62. A free end 78 of the lever arm 68 is coupled to a reference point 80 by a resilient means 82.

A force, diagrammatically represented by the arrow 84, when applied to the end 78 of the lever 68 causes the lever to rotate about its fulcrum 70, thereby urging the shoes 76 into contacting relation with their respective drums 62. As described in relation to FIG. 1, the shoes 76 assume a position in the slots 74 in accordance with the direction of movement of the particular moving member they contact. In the arrangement of FIG. 2, the application of a force 84 through the single lever means 68, results in a different amount of braking on the respective members 60, in accordance with the distance that each of their shoes 76 is positioned with respect to the single fulcrum 70.

Figures 3, 4:
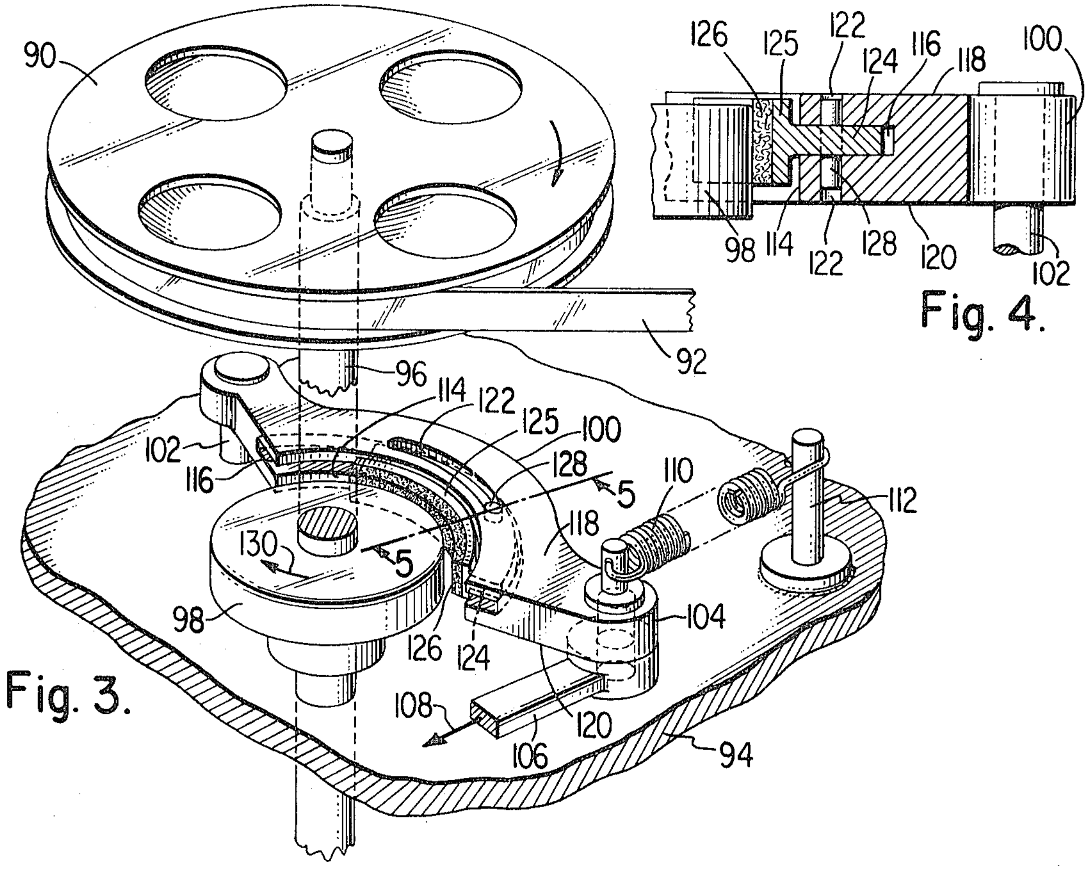
FIG. 3 is a perspective view of another embodiment of the invention.
FIG. 4 is a section view along the section line 5—5 of a portion of FIG. 3.

FIG. 3 shows, for example, a particular method of implementing the invention for use in reeling-type systems such as tape recorders, film projectors and material handling apparatus. FIG. 3 shows a storage device 90 for an elongated medium 92. The storage device 90 is rotatably mounted to a frame member 94 by means of a shaft 96. Fixed about the shaft 96 is a cylindrical brakedrum 98. Extending along adjacent the brakedrum 98 is a U-shaped member 100. The member 100 is pivotally mounted at one end to the frame 94 by means of a pin 102. The end 104 of member 100 may be rotated to cause the member 100 to move toward or away from the brakedrum 98. The movement of the member 100 toward the drum 98 is effected by an arm 106 coupled to the member end 104, to which a force may be applied in the general direction of arrow 108. This movement is opposed by the resilient means 110 which is coupled between end 104 and a pin 112 affixed to the frame 94. It will thus be understood that the member 100 is arranged and does operate as a lever means with its fulcrum being the pin 102.

Further details of the arrangement of FIG. 3 may be better understood, by a consideration of FIG. 3 in conjunction with FIG. 4 which is a view of FIG. 3 along the section line 5—5. FIGS. 3–4 show that in the surface 114 of the member 100 which is in juxtaposed relation with the drum 98, there is a channel 116 extending partially about the periphery of the drum 98. In both the upper 118 and lower 120 surfaces of the member 100 are elongated slots 122 which communicate with the interior channel 116. The slots 122 are arranged substantially concentric with the periphery of the drum 98, but are not coterminal with the channel 116.

Disposed in the channel 116 is a generally T-shaped member 124 having a curved portion or brakeshoe 125, which extends from the channel 116 and is adapted to coact with the periphery of the drum 98. On the curved portion of the member 124 is preferably a wear resistant member 126. The T-shaped member 124 is mounted for slidable movement along the periphery of drum 98 in the channel 116 by a pin 128. The pin 128 extends through the T-member 124 with the ends of the pin 128 captured by the slots 122.

The manner of operation of the arrangement of FIG. 3 is substantially the same as described for the diagrammatic arrangement of the assemblies shown and described with reference to FIG. 1. As shown in FIG. 3, the brakedrum 98 is rotating in the direction designated by the arrow 130. A force is applied generally in the direction 108 which is sufficient to overcome the opposition of the resilient means 110. The member 100 is moved toward the drum 98 urging the brakeshoe member 124 into contacting relation with the periphery of the drum 98. This contact causes the pin 128 to be driven to the extreme of the slot 122 as shown in FIG. 3, with the resulting braking applied to the drum 98 being a function of the distance between the pin 128 and the fulcrum 102. In the manner previously explained, by reversing the direction of rotation of the drum 98, and apply the same force 108, the pin would be driven to the other extreme of the slot 122. This results in a greater braking force being applied to the drum 98, since the distance or effective length of the force arm from the fulcrum 102 to the point of transmission of the braking force 128 is less.

Figure 5:
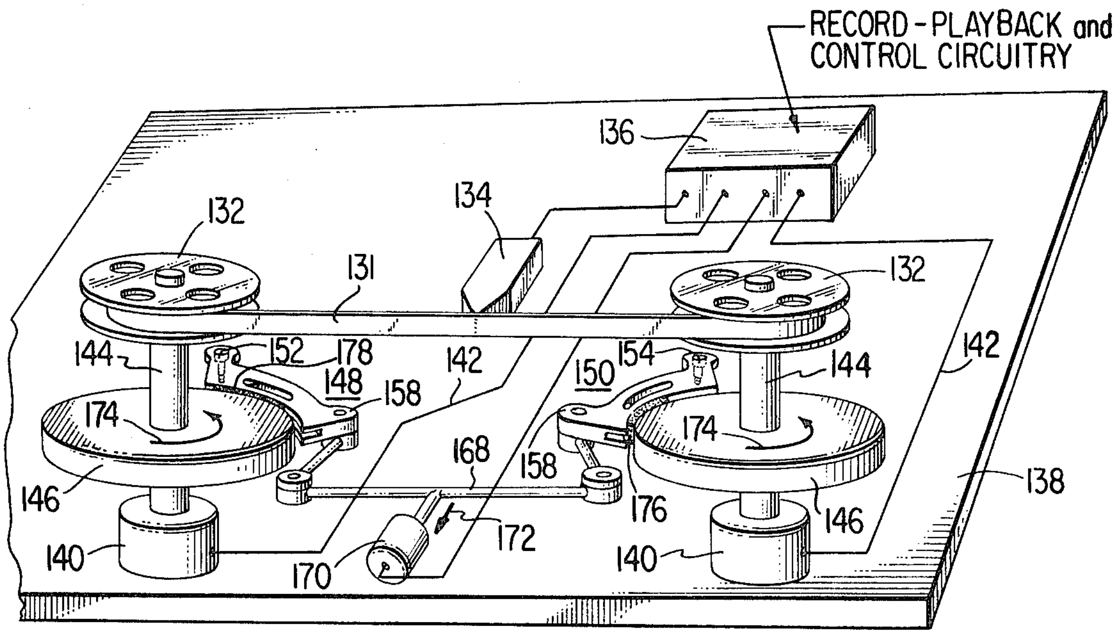
FIG. 5 is a perspective view of a still further embodiment of the invention.

FIG. 5 shows an arrangement of a recorder-reproducer system embodying the present invention. In FIG. 5, a recording medium 131 is wound between a pair of reels 132. Arranged in transducing relation with the medium 131 is a transducer 134. The transducer 134 receives signals from and supplies signal to the record-playback and control circuitry 136. A pair of prime movers such as motors 140 are mounted to a frame member 138. The prime movers 140 are energized and controlled through couplings 142 from the record-playback and control circuitry 136. The reels 132 are coupled to the prime mover 140 by shafts 144. Secured about each shaft 144 is a brakedrum 146.

Disposed adjacent each drum 146 are brake assemblies 148 and 150, which are rotatably mounted at one end to the frame 138 by means of rods 152 and 154 respectively. The brake assemblies 148 and 150 are constituted and they operate substantially as shown and described in relation to FIGS. 3 and 4.

In FIG. 5, the free ends 158 of the assemblies 148 and 150 are coupled by means of pivotal connecting elements 168 to an actuator member 170. The actuator member 170, which may for example be a solenoid, is controlled by the circuitry 136.

Upon command from the circuitry 136, the actuator member 170 is energized, causing the connecting elements 168 to move in the general direction of arrow 172. This causes the brakeshoes of the assemblies 148 and 150 to be brought into contacting relation with the brakedrums 146. In accordance with the direction indicating arrows 174, the reel 132 shown at the left is the supply reel, which is feeding the recording medium 131 to the reel shown at the right, which is the takeup reel. In response to the direction of movement of the respective brakedrums 146, the brakeshoe 176 of assembly 148 and the brakeshoe 178 of assembly 150 are positioned as shown in FIG. 5. As indicated in FIG. 5, the brakeshoe 178 is positioned closer to its fulcrum 152 than the shoe 176 is positioned with respect to its fulcrum 154. Therefore, a greater amount of braking is applied to the reel 132 which is supplying the medium 131, than the braking on the reel 132 which is acting as the takeup reel. When the direction of rotation of the drums 146 and their associated reels 132 are reversed, as already fully explained, the relative amount of braking on the respective reels 132 is automatically reversed. Thus a unique and simple system is provided for accomplishing bidirectional differential braking of the pair of reels 132.

It is to be understood that, while the invention has been shown and described in relation to rotating members to be braked, the invention is equally applicable for braking members undergoing other types of motion such as translation motion.

What is claimed is:

1. Apparatus for braking a moving member, said member having a surface adapted to having a braking force applied thereto, comprising in combination:

an arm disposed adjacent said surface, said arm being pivotally mounted at one end thereof with the other end of said arm free to move toward or away from said surface of said member;

a brakeshoe adapted to coact with said surface of said member disposed between said arm and said surface, said shoe being slidably mounted to said arm for movement between two fixed points along said arm;

said arm having a slot therein and a pin affixed to said brakeshoe disposed in said slot; and means for urging said arm in a direction to cause said shoe to be in contacting relation with said surface of said member, the position of said shoe with respect to said pivotable arm end being determined by the direction of movement of said member.

2. In combination:

a rotatable member having an arcuate surface adapted to have a braking force applied thereto;

a lever arm disposed adjacent said surface of said member, said lever arm having a portion concentric with said surface, one end of said lever arm being pinned with the other lever arm end being free to rotate toward or away from said arcuate surface;

a brakeshoe between said lever arm and said surface and adapted to cooperate with said arcuate surface of said rotatable member, said shoe being mounted to said lever arm in a manner to enable sliding motion of said shoe along said arcuate portion of said lever arm;

said arcuate portion of said lever arm including a generally U-shaped channel section, having in at least one side of said section an enclosed arcuate slot concentric with said surface, said brakeshoe having a portion which is disposed in the channel of said U-shaped section and a pin element affixed to said shoe portion and in captured engagement with said slot; and means urging the free end of said lever arm toward said member to cause said shoe to be in contacting relation with said surface of said rotating member.

3. A differential braking system for use in a recorder-reproducer system including at least first and second rotatable reels, each of said reels having a brakedrum and a brakeshoe associated therewith, comprising; lever means including a fulcrum arranged adjacent said brakedrum, first and second brakeshoes disposed between said lever means and the respective brakedrums of said first and second reels, each of said brakeshoes being slidable mounted to said lever means on opposite sides of said fulcrum for movement with respect to said fulcrum between fixed limits along said lever means when said shoe is in contacting relation with said brakedrum, each of said shoes being positioned at one or the other of said fixed limits in response to the direction of rotation of its associated brakedrum, and means coupled to said lever means for urging said shoes into contacting relation with said brakedrum.

4. Braking apparatus for use in a recorder-reproducer system, including first and second rotatable reels, each of said reels having a brakedrum associated therewith, comprising: lever means mounted adjacent each of said brakedrums, each of said lever means having an arm pivotably mounted at a first end to a fulcrum with the second end of said arm free to rotate toward or away from said brakedrum, first and second brakeshoes. Means for mounting each of said shoes to a respective one of said arms to enable each of said shoes to move toward or away from said first end of said arm in response to the direction of rotation of said associated brakedrum when said shoe is in contacting relation with said brakedrum, one of said lever means having its first and second ends oriented to cause its brakeshoe to be positioned nearer its fulcrum in response to the rotation of its brakedrum while the other of said lever means having its first and second ends oriented to cause its brakeshoe to be positioned further from its fulcrum in response to the rotation of its brakedrum, and means for applying a force to said lever means to urge said first and second brakeshoes into contacting relation with their respective brakedrums.

5. A differential braking system for braking first and second moving members, each of said moving members having a braking surface adapted to have a braking force applied thereto and a brakeshoe associated therewith, comprising; lever means disposed adjacent the braking surface of each of said first and second members, the lever means for each of said members including an arm which is pivotally mounted at one portion thereof to a fulcrum with a free end portion of said arm rotatable toward and away from said braking surface, first and second brakeshoes, respective ones of said first and second shoes being disposed between the arm and the braking surface of said first and second members respectively, each of said brakeshoes being slidably mounted to said arm for movement with respect to said fulcrum between fixed limits along said arm when said brakeshoe is in contacting relation with its braking surface, said first and second brakeshoes being respectively positioned at a different one of its fixed limits in response to the direction of rotation of the braking surface of said corresponding first and second members, and means for applying a force to the lever means for each of said first and second moving members to urge said first and second brakeshoes into contacting relation with the respective braking surface of said first and second moving members.

* * * * *